July 19, 1949.  A. E. BAAK  2,476,277
CONTROL APPARATUS
Filed May 5, 1944  5 Sheets-Sheet 3

Inventor
ALBERT E. BAAK
By George H. Fisher
Attorney

July 19, 1949.

A. E. BAAK 2,476,277

CONTROL APPARATUS

Filed May 5, 1944

Inventor
ALBERT E. BAAK

By

George H. Fisher
Attorney

July 19, 1949.　　　　　A. E. BAAK　　　　　2,476,277
CONTROL APPARATUS

Filed May 5, 1944　　　　　　　　　　　　　　5 Sheets-Sheet 5

Inventor
ALBERT E. BAAK

By

George H. Fisher
Attorney

Patented July 19, 1949

2,476,277

UNITED STATES PATENT OFFICE 2,476,277

CONTROL APPARATUS

Albert E. Baak, Los Angeles, Calif., assignor to Minneapolis-Honeywell Regulator Company, Minneapolis, Minn., a corporation of Delaware Application May 5, 1944, Serial No. 534,199

20 Claims. (Cl. 230—5)

This invention relates to improvements in electrical control apparatus.

The invention has reference and application to that type of control apparatus wherein a normally balanced alternating current network, or Wheatstone bridge circuit is employed. Such a circuit ordinarily has two branches, one of which includes a sensing or control resistance usually of the potentiometer type, which is positioned by and senses the variations in the condition to be controlled, a change in such condition from its selected or desired value acting to unbalance the circuit so that it provides an alternating potential which may be utilized to vary the said condition and restore it to the selected value. The network or circuit further includes a second branch, in parallel with the first, and embodying a second potentiometer type variable follow-up or rebalancing resistance which is adjusted in accordance with and as a result of the variation in the first resistance, to restore the circuit to balance after each change in the condition controlled thereby.

Such a control system finds one use in the control of the intake manifold pressure of an aircraft engine. Such engines are provided with a compressor for compressing the air delivered to the intake manifold, and a turbine, actuated by exhaust gases from the engine, for driving the compressor, this assembly being generally termed a supercharger. In such use the control system has its sensing or control resistance arranged to be positioned in accordance with variations in the manifold pressure in order to introduce unbalance in the network or bridge circuit when this pressure deviates from the desired or selected value. The follow-up or rebalancing resistance or potentiometer, is then adjusted in accordance with the positioning of a waste gate or valve, which is adjusted as a result of unbalance in the bridge circuit and which controls the speed of the turbine and compressor. My improved control system may, however, be used in connection with and for controlling other conditions, and I do not intend to limit myself to the specific uses herein set out. However used, such systems involving the balanced bridge, with a control sensing variations in the regulated condition and another control operating to restore the bridge to balance, have several disadvantages in operation. In the first place, a rapid or severe change in the condition to be controlled, introducing a sharp and pronounced unbalance in the bridge has a tendency to cause "hunting" of the controls. That is, and taking again the example of use in connection with the supercharger, a pronounced change in manifold pressure will call for a substantial closing of the waste gate, which in turn will tend to build up the manifold pressure. If the waste gate remains in this position too long, the turbine will accelerate so rapidly as to cause the pressure to overshoot the desired value and thus call for reopening of the gate. The result may be a violent shifting of the controls in the attempt to reestablish a manifold pressure somewhere near the selected or initial value. Then too, a slight and gradual change in manifold pressure will introduce little unbalance in the bridge circuit having but little and very slow effect on the waste gate setting.

My invention therefore has, as one important object, the provision of means in connection with the sensing or control resistance of the bridge which will operate in response to a change in manifold pressure, or other controlled or regulated condition, to first sharply change the value of such resistance to introduce a greatly unbalanced condition in the bridge and so start the system in operation rapidly to counteract such change. The control then automatically and gradually reduces the magnitude of such unbalance, or eliminates it gradually, at a rate dependent on the amount of change in the controlled condition and the speed with which such change is being counteracted or restored to the normal value. The system thus prevents the hunting previously described and further enables even slight variations in the controlled condition to be rectified.

Another disadvantage in the ordinary bridge circuit control system is the "drooping" tendency in its operation. Assuming, for example, a certain value of the manifold pressure, or other condition, to have been selected and the bridge to be properly balanced therefor, a decrease in the pressure will, of course, introduce an unbalance in the bridge causing the waste gate to be closed to build up the pressure again toward its starting value. However, as the waste gate closes, the follow-up potentiometer is varied toward a new condition of balance with respect to the sensing potentiometer, and, since the increasing pressure tends to restore this latter potentiometer toward its initial position, a point of balance will occur at which the waste gate movement is halted and the bridge circuit rebalanced, but with the waste gate slightly more closed and the manifold pressure slightly less than the initial value. This decrease in pressure represents the characteristic droop of such systems.

My invention has a further and important object, therefore, the provision of a means or system for eliminating such drooping characteristic in such manner that the manifold pressure, or other regulated condition, may be restored exactly to its initial or selected value, after every change, whether such change is positive or negative in character.

A further object of the invention is to provide improved means for actuating the control resistances or impedances in such systems to achieve the desired results above set forth, and which means will carry out such actuation entirely automatically.

With these and other ancillary objects in view, the invention resides in the novel system and arrangement of the parts thereof, as hereinafter fully disclosed and claimed, reference being had to the accompanying drawing wherein:

Referring now with greater particularity to Figures 1-4 of the drawing, I have shown therein the application of my improved control system to a supercharger unit 10 which includes a turbine wheel 11 adapted to be driven by exhaust gases from an aircraft engine and which in turn drives a compressor rotor 12 located in the compressor housing 13. The compressor receives air at atmospheric pressure at the intake 14 and delivers it under compression through a conduit 15, a throttle 3, a carburetor 4, a compressor 5 driven directly by the engine 2 through a shaft 6, and an intake manifold 7 to the engine 2. The exhaust gases from the engine pass through an exhaust manifold 8 and a conduit 9 to the turbine where they enter a nozzle box 16 and may either discharge to the atmosphere as waste, through the outlet 17, or may be deflected in part through the nozzles 18 to impinge the turbine wheel 11 and cause it to rotate. The rate of such rotation is controlled by a valve 19, commonly called a waste gate, located in the outlet 17 and which when opened permits the exhaust gases to discharge with little effect on the turbine. As the waste gate is gradually closed, the exhaust gases impinge with increasing force on the turbine wheel 11 causing it, and of course the compressor rotor 12, to rotate at increasing speeds. It is seen therefore that the position of the waste gate will directly control the absolute pressure in the intake manifold of the engine.

Figure 1:
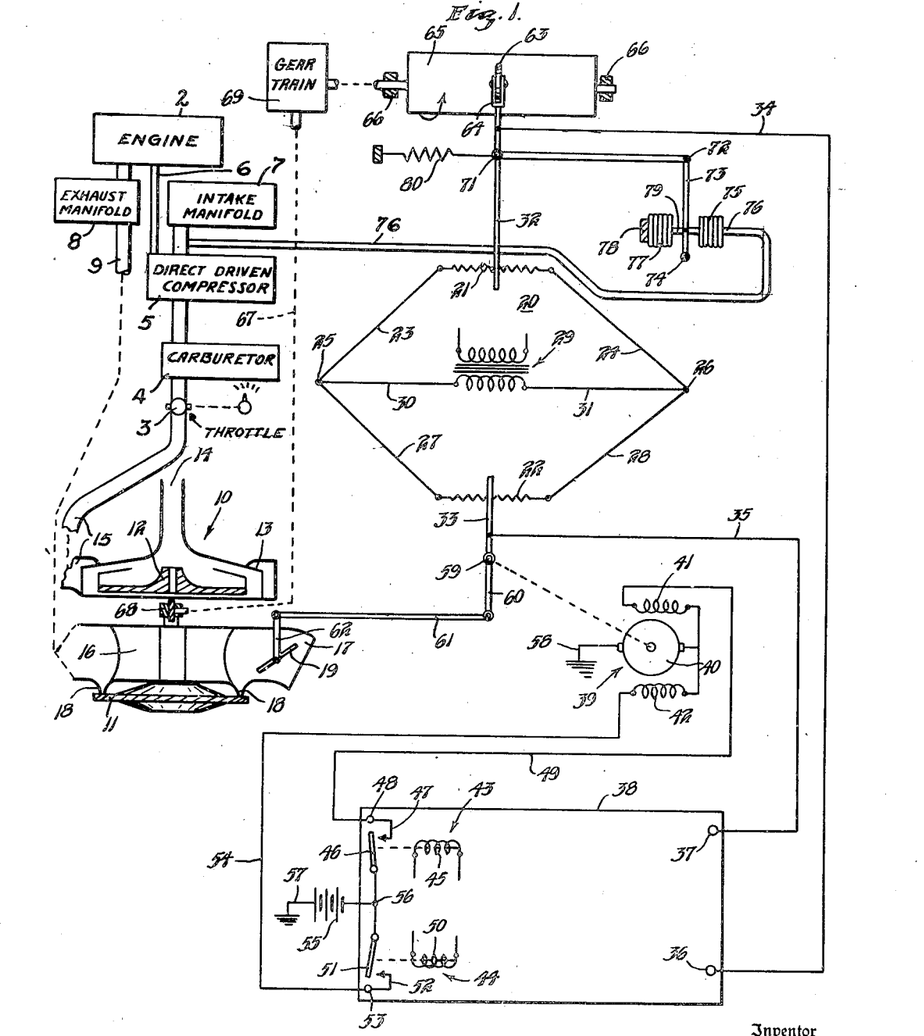
Figure 1 is a diagrammatical view showing the control system as applied to and controlling the operation of a turbine driven compressor, and illustrating the means for eliminating hunting of the system as well as causing a rapid initial unbalance in the bridge or network, and subsequent diminution thereof.

The control system comprises an alternating current network or Wheatstone bridge 20, here shown in its simplest form as comprising two parallel branches, one including a sensing or control resistance 21 and the other a follow-up or rebalancing resistance 22. The resistance 21 is connected by conductors 23 and 24 to terminals 25 and 26 respectively, while resistance 22 is similarly connected by conductors 27 and 28 to these terminals. The terminals 25 and 26 serve as input terminals by which the bridge is supplied with an alternating potential, a transformer 29 being shown for this purpose and having its secondary connected by conductors 30 and 31 to the input terminals. The conductors 23, 24, 27 and 28 will ordinarily include additional resistances in the usual manner but they are omitted herein for simplicity.

The resistances 21 and 22 are of the potentiometer type, having wipers or sliders 32 and 33, respectively, adapted to traverse them from end to end, and serving as variable taps or output terminals for the bridge to which the conductors 34 and 35 are respectively connected. These conductors 34 and 35 are connected to the input terminals 36 and 37 of an electronic amplifier 38 which may be of the type disclosed in the copending application of Albert P. Upton, Serial No. 437,561, filed April 3, 1943, now matured into Patent No. 2,423,534 of July 8, 1947, to which attention is invited for a complete disclosure. This amplifier controls a waste gate positioning motor 39 which is here shown as being a direct current reversible type having an armature 40 and two field windings 41 and 42 which are selectively energized to rotate the motor in opposite directions. An alternating current motor may of course be used instead, if desired.

The amplifier 38 includes, or controls a pair of relays 43 and 44 and the relay 43 comprises a winding 45 which when properly energized attracts a movable contact 46 causing it to engage a fixed contact 47, connected to an output terminal 48 from which leads a conductor 49 to one end of the motor field winding 41. The relay 44 comprises a winding 50 adapted to attract a movable contact 51 and bring it to engagement with a fixed contact 52, connected to an output terminal 53 from which leads a conductor 54 to one end of the other field winding 42. The movable contacts 46 and 51 are, of course, biased to normally clear their respective fixed contacts 47 and 52. The movable contacts 46 and 51 are connected together and to one terminal of a battery 55 by conductors 56 and the other terminal of the battery is grounded as shown at 57. The other ends of the motor windings 41 and 42 are connected through the armature 40 to ground as shown at 58.

When the relay 43 is energized, a circuit may be traced from one terminal of the battery 55 through the conductors 56, contacts 46 and 47, terminal 48, conductor 49, motor field winding 41 and through the armature 40 and grounds 58 and 57 back to the battery. When this circuit is thus closed the motor 39 will rotate in one direction. When relay 44 is energized, a similar circuit may be traced from the battery 55 through conductors 56, relay contacts 51 and 52, terminal 53 and conductor 54 to field winding 42, and through the armature 40 and grounds 58 and 57 back to the battery, to cause the motor to rotate in the opposite direction.

The amplifier 38 is operative to selectively energize the relays 43 and 44 in accordance with the phase of the signal potential impressed across its input terminals 36 and 37, energizing one relay when the signal is of a certain phase and energizing the other if the signal is one hundred and eighty degrees out of phase with the first. The phase relation of the incoming signal is thus seen to control the direction in which the motor is rotated. It is obvious that the signal supplied to the amplifier input terminals 36 and 37 by the bridge will be nil when the sliders 32 and 33 are at points along their respective resistances 21 and 22 which are at balance with respect to the input terminals 25 and 26 but, due to the alternating current supply to the bridge, the signal across the amplifier input, when either slider 32 or 33 is moved from such balanced position, will vary in phase angle according to the direction in which such unbalance occurs. In other words, movement of a slider 32 or 33 in one direction will introduce a signal voltage energizing one relay 43, or 44, and causing the motor 39 to rotate in one direction, while opposite movement of the slider will energize the other relay and reverse the direction of rotation of the motor.

The motor 39 is connected, as shown diagrammatically in the drawing, to a shaft 59 which carries the wiper or slider 33 so that opposite rotation of the motor will move the slider in opposite directions along the resistance 22. An extension 60 of the wiper 33 is connected by a link 61 to a crank 62 on the waste gate 19 and the arrangement is here shown as such that movement of the wiper 33 to the right along the resistance will be accompanied by closing movement of the waste gate, and vice versa. It is to be understood that suitable speed reducing mechanism such as a gear train (not shown) is interposed between the motor 40 and shaft 59.

The wiper 32 is usually positioned by and in accordance with the absolute pressure in the intake manifold of the engine and the manner in which this adjustment takes place will be hereinafter pointed out. At this point, however, it will be assumed that, from a center position along the resistance 21, as shown in Figure 1, the wiper 32 will move to the right as the manifold pressure decreases, and vice versa. The center position of the wiper 32 is selected as a reference and it is assumed that under such conditions the bridge 20 will be balanced with the wiper 33 also at a center reference point along resistance 22, and the waste gate 19 positioned to maintain a certain preselected value of manifold pressure. The exact pressure thus selected as a starting point in this description is immaterial and it is for the reason that no additional resistances are shown in the bridge for manually selecting this pressure and initially setting up the bridge.

Now should the manifold pressure decrease, due for example to the ascent of the aircraft to a higher altitude at which the atmospheric pressure falls off, the wiper 32 will move to the right along the resistance 21, immediately unbalancing the bridge and causing a signal voltage to be impressed across the amplifier input terminals 36 and 37. The phase angle of this signal voltage is such that the motor 39 is caused to rotate in a direction for closing the waste gate 19 and increasing turbine speed to build up the manifold pressure toward the starting value. When the pressure increases above starting value the reverse effect takes place and the waste gate slowly opens to reduce the turbine speed.

As the waste gate moves toward closed position, the wiper 33 moves to the right toward a point at which it is again at the same potential with respect to the bridge input terminals 25 and 26 and at the same time the manifold pressure as it is built up again will move the slider 32 back toward starting position. A point will obviously be reached at which the sliders 32 and 33 are again at balance or at the same potential, whereupon the motor 39 will stop, leaving the waste gate slightly more closed than previously, but with the manifold pressure slightly less. As previously described, this represents the characteristic droop of this type of system.

Should the manifold pressure decrease sharply for any reason, the wiper 32 will be moved quickly and far to the right causing an unbalance voltage of considerable amplitude to be developed and running the waste gate far toward closed position so that the pressure is then rapidly built up. If the waste gate is allowed to remain in closed position, the turbine will accelerate so rapidly that the wiper 32 will be returned sufficiently far to the left to unbalance the bridge in the opposite direction, causing opposite rotation of the motor to open the waste gate. This rapid fluctuation may cause hunting of the system, greatly hindering its operation. On the other hand, a slow and slight decrease in manifold pressure may move the wiper 32 only slightly and the waste gate 19 will close only slightly causing a falling off of the pressure for some time before it is again built up. Either action is undesirable as will be readily apparent.

To counteract the latter two disadvantageous actions I provide the following system and arrangement of a roving or shifting pivot center for the wiper 32. This wiper has no fixed pivot but instead carries at its end a roller 63 journaled in a fork 64 and which bears peripherally upon a drum or cylinder 65 which is journaled in supports or bearings 66. The roller 63 has a rubber or similar traction surface while the drum 65 is of metal. Any suitable combination of these materials may be used for these parts so that rotation of the drum will in turn continuously rotate the roller.

The drum 65 is rotated by the turbine-compressor unit by a suitable connection represented diagrammatically at 67 to the usual tachometer connection 68 of the turbine. A gear box 69 is interposed in the connecting shafts in such manner that the drum 65 will rotate at a much slower speed than the turbine but at a speed proportional at all times to the speed of said turbine.

For actuating the wiper 32 I provide a link 70 which is pivoted thereto at 71 and which is connected at 72 to an arm 73 pivoted at 74. An evacuated bellows 75 is supported adjacent the arm 73 and has a connection 76 leading to the intake manifold 7 so that the air pressure within the bellows will indicate the absolute intake manifold pressure. Opposed to the bellows 75 is another bellows 77 which is spring loaded and which compensates for the effects of air pressure on bellows 75, this bellows 77 being supported as designated at 78. A connection is made at 79 between the two bellows 75 and 77 and the arm 73 so that their expansion and contraction will swing this arm about its pivot 74. A spring 80 normally swings the slider 32 to the left as seen in Figure 1.

The rotation of the drum 65, as indicated by the arrow, is such that it moves in a direction away from the resistance 21 on the side engaging the roller 63, and it therefore exerts a continuous endwise drag on the wiper 32 in this direction. The wiper is, of course, supported against endwise displacement due to this drag, for example by its wiping contact with the resistance, and the result of the drag is to at all times tend to straighten out the wiper to a position extending at right angles to the axis of the drum.

Figures 2, 4:
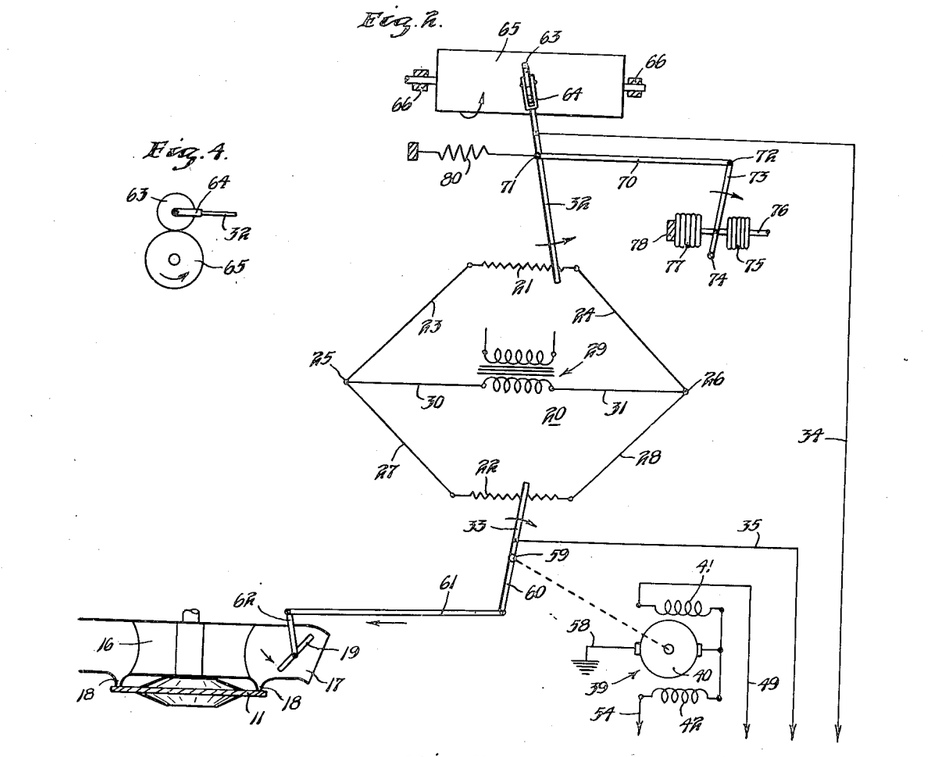
Figure 2 is a similar view, with certain parts of the system eliminated, and showing the manner in which a large initial unbalance is introduced into the system to cause rapid initial operation thereof.
Figure 4 is an end view of the adjustable or roving wiper pivot as shown in Figures 1-3.
Figure 3:
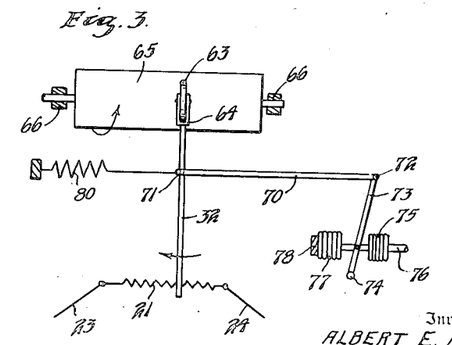
Figure 3 is a diagrammatic view showing the manner in which the adjustable or roving pivot center for the wiper of the primary or control resistance of Figures 1 and 2 gradually reduces the magnitude of the initial unbalance as introduced in Figure 2.

Assuming again the initial position of the wiper 32 at the center of the resistance (Figure 1) when the bridge is balanced and the manifold pressure is at the desired value, a decrease in this pressure will cause collapsing movement of the bellows 75 swinging the arm 73 in such manner as to pull upon link 70 and move the wiper 32 to the right, as has been described, in order to start the waste gate 19 toward a closed position. As shown in Figure 2 the wiper 32 swings about the center of contact between the rollers 63 and drum 65 as a pivot in this process. Immediately, however, the rotation of the drum 65 begins to straighten out the wiper 32 swinging it about its pivotal connection 71 with the link 70 until it is again straightened out as seen in Figure 3. This action moves the wiper 32 back towards the right or toward its initial position at a rate which depends upon the speed of rotation of the drum 65 and at a rate which, therefore, is proportional to the speed of the turbine and the compression ratio of the compressor 10. In this action the roller 63 describes a path along the drum to a new position along the length thereof and which path takes the form of a tractrix curve.

The result of the initial wide swing of the wiper 32 along the resistance 21 and its subsequent gradual return movement toward starting position, is to cause an instantaneous unbalance voltage of considerable magnitude to be developed by the bridge to start the motor 39 into operation quickly to counteract the reduction in pressure causing such movement of wiper 32. Before the wiper 33, actuated by the motor can carry out a corresponding wide swing which would probably cause the system to go into a violent hunting or oscillating condition, however, the wiper 32 is being retarded by the drum and roller operation and worked back toward starting position to balance out the initial large unbalance and enable the system to come quickly to balance again without trouble. This action is true of a sudden and wide deviation of the manifold pressure, either positive or negative, from its initial value, and, by proper proportioning of the leverages involved in the wiper 32 and arm 73 a comparatively slight deviation in pressure, corresponding slight expansion or contraction of the bellows 75, may be caused to move the wiper through a fairly wide range in order to quickly call for a proper actuation of the waste gate 19.

To overcome the drooping characteristic of such a control, as has been described above, I provide the system shown in Figures 5 through 9. Here the bridge and amplifier circuits are identical to that previously described and the corresponding circuit elements are accordingly designated by the same reference characters. The amplifier itself is not shown, although the leads thereto, as well as the conductors to the motor 39 are indicated. The turbine and compressor unit is also the same but the waste gate 19 is actuated in this case by a crank 81 to which the motor 39 is connected, as shown at 82, so that through a link 83 and crank 84 the waste gate may be opened and closed, by opposite rotation of the motor.

Figure 5:
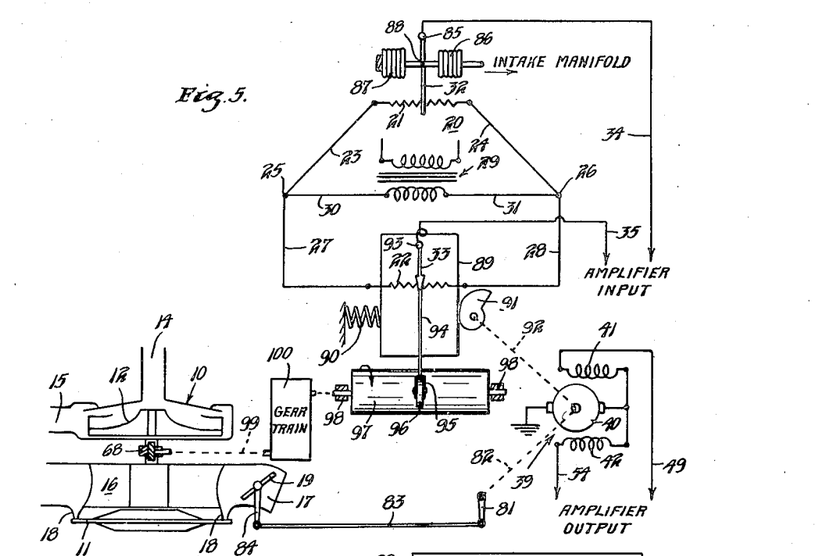
Figure 5 is a diagrammatical view showing the application of the system to the control of the turbine-compressor unit in similar fashion to that previously shown, and illustrating the means for eliminating the droop characteristic of the system.

The wiper 32 for the resistance 21 is shown as pivoted at 85 to swing across this resistor, and the bellows 86 which is connected to the intake manifold and the compensating bellows 87, are connected as at 88 directly to the wiper. Again the wiper 32 will be moved to the right by a decrease in intake manifold pressure, and vice versa.

The bridge rebalancing or follow-up potentiometer resistance 22 is now arranged for opposite movements in the direction of its length and is shown as carried therefor upon a movably supported member 89 which is urged in one direction by a spring 90 and bears in the same direction against a cam 91. By rotation of this cam 91, the resistance may be moved toward the spring 90, or allowed to move back in the opposite direction under influence of the spring. Opposite rotation of the cam 91 causes this action and the cam is accordingly operated by a connection 92 to the motor 39. The wiper 33 for the resistance 22 is pivoted at 93 upon the carrier member 89 so that this pivot moves with and maintains a constant relation with respect to the resistance. The wiper 33 has an extension 94 beyond the resistance and the end of this extension has a fork 95 in which a roller 96 is journaled. The roller 96 rides the periphery of a drum or cylinder 97 which is journaled in bearings 98 and with respect to which the resistance 22 is shiftable in a direction substantially parallel with the axis of the drum. The drum 97 is rotated, in the direction indicated by the arrow, to exert an endwise drag on the wiper 33, by means of a connection 99 to the tachometer drive 68 of the turbine. A gear box 100 is used in such connection 99 to reduce the drum speed while keeping it proportional to the speed of the turbine in the manner previously disclosed herein.

Figure 6:
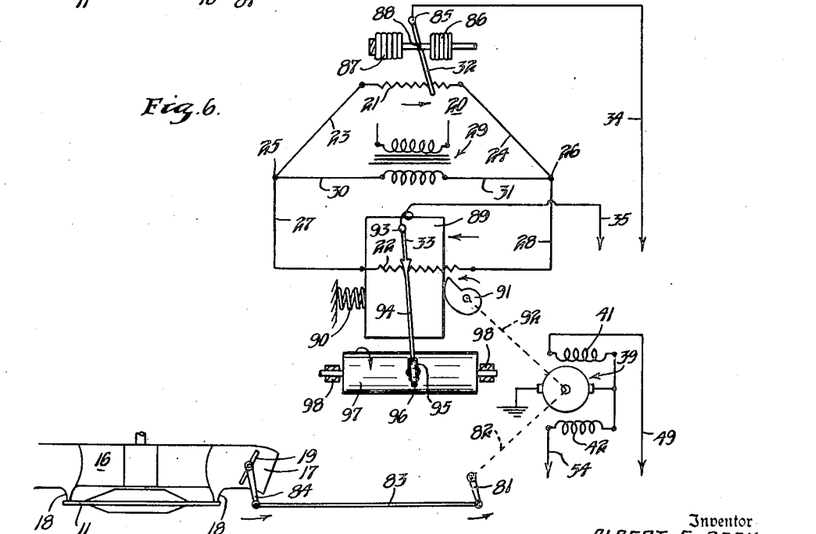
Figures 6 through 9 are similar views illustrating the operation in various stages, after a change in manifold pressure and showing the manner in which the pressure is restored exactly to its initial value.

In operation, should the manifold pressure decrease, the resulting contraction of the bellows 86 will move the wiper 32 along the resistance 21 toward the right as shown in Figure 6. The bridge will then be unbalanced in such manner as to cause the motor 39 to rotate in the proper direction to run the waste gate 19 toward the closed position, the cranks 81 and 84 moving in the direction indicated by the arrows in Figure 6. At the same time the motor 39 will rotate the cam 91 in the direction indicated causing it to urge the carrier member 89 toward the left. The engagement between the roller 96 and drum 97 will cause the wiper 33 to be moved along the resistance 22 toward the right by this endwise movement of the resistance as also seen in Figure 6, thus moving this wiper toward, but not to a position at balance with, or at equal potential to the wiper 32. The wiper 33 of course is angled about its pivot 93 in this operation.

Figure 7:
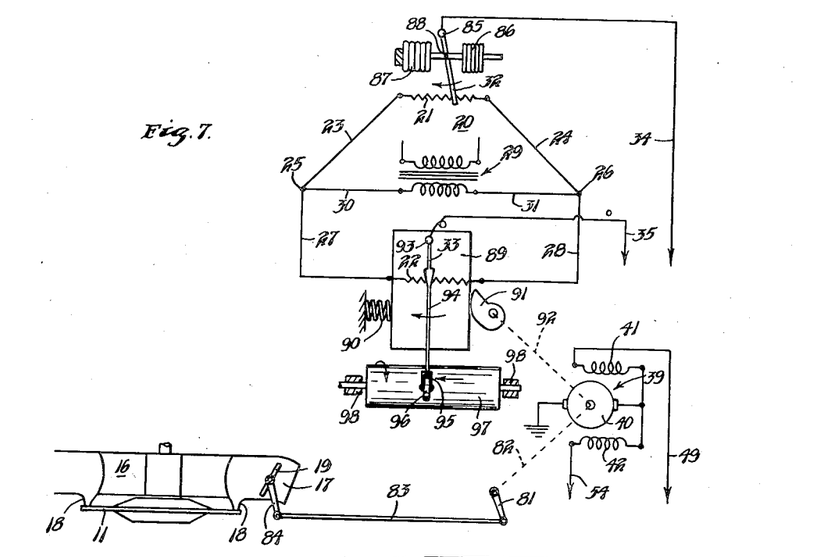
Figure 8:
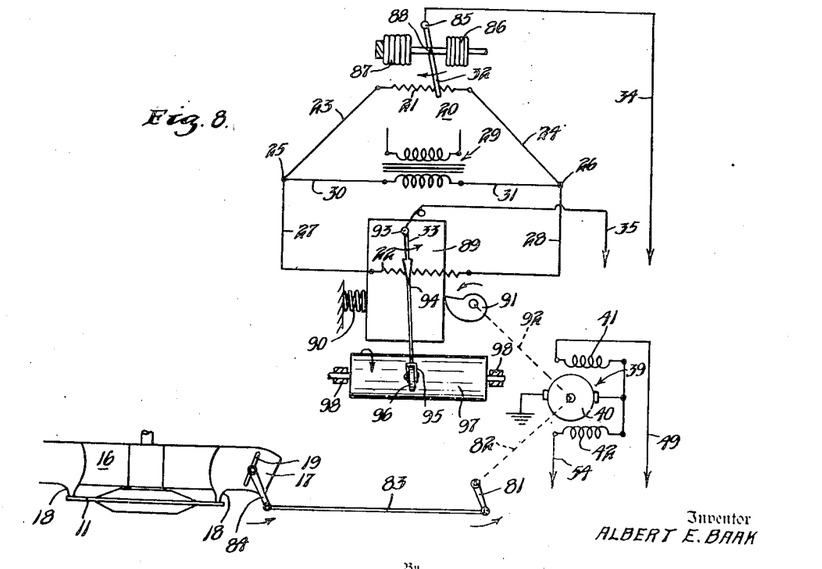
Figure 9:
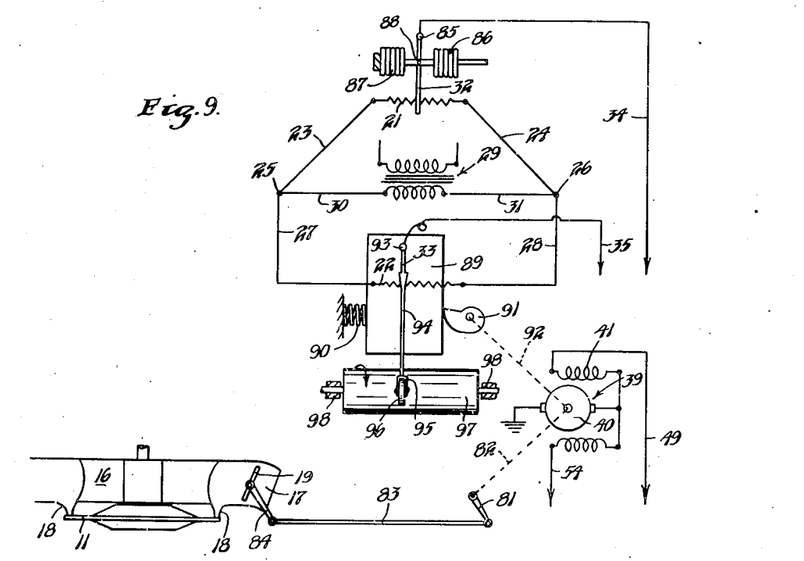

The endwise drag of the rotating drum 97 upon the roller now will tend to straighten out the wiper 33 toward a position at right angles to the axis of the drum and as has been previously set forth. This action, illustrated in Figure 7 tends to move the wiper 33 back toward its starting position but this is counteracted to some extent by the continued rotation of the cam 91 which is still moving the resistance 22 toward the right as seen in Figure 8. At the same time the pressure in the intake manifold is building up again, due to the closing movement of the waste gate 19, and the expansion of the bellows 86 causes the wiper 32 to move back to the left as seen in Figures 7 and 8 toward its initial balanced position. These actions will continue in succession until finally the intake manifold pressure will return to its initially selected value at which the wiper 32 is back at starting position and at which time the drag of the drum 97 upon the roller 96 will straighten out the wiper 33 and, since the resistance 22 remains parallel with the drum and wiper pivot 93 is fixed with respect to the resistance, it will be obvious that this wiper 33 will also be thus returned to its initial position, when the bridge is again at balance, as seen in Figure 9. However, as shown in this drawing, the resistance 22 has been displaced to the left from its starting position of Figure 5 by the rotation of the cam 91 and the waste gate is left at a slightly more closed position with respect to its starting position.

It will be evident, therefore, that instead of the bridge being rebalanced at a different position of the wipers 32 and 33, as previously described and which can only result in a droop in the manifold pressure, the bridge can now be rebalanced only when the wipers return to the same position as that from which they start, and this can occur only when the manifold pressure has returned exactly to its selected initial value after each change therefrom.

The just described operations will take place, too, if the manifold pressure increases above its selected value, the wipers then moving initially in opposite directions to those described but finally returning to starting positions when the pressure is returned to said selected value by opening movement of the waste gate.

In any case, it will be evident that it is the movement of the follow-up or rebalancing resistance 22 endwise to initially shift its wiper 33 and the subsequent straightening drag of the drum 97 upon the roller 96 which returns the bridge to balance only when the wipers are returned to their starting positions. In such operation the roller 96 of course describes a path along the roller which follows a tractrix curve as has been described. The rate at which this straightening out process or automatic shifting of the wiper takes place depends upon the speed at which rebalancing of the bridge is required. Obviously when the waste gate is nearly closed the turbine and compressor are rotating near their highest permissible speeds and adjustments of the waste gate to compensate for variations in the intake manifold pressures should be carried out quickly. This actually is the case since under these conditions the drum 97 is rotating at about its fastest speed and the roller 96 will accordingly be quickly shifted.

As will be understood the floating or roving wiper arrangement for the sensing or control potentiometer as shown in Figures 1–4 might also be applied to the system as shown in Figures 5–9 to provide a system overcoming all the defects of previous somewhat similar systems, as has been pointed out.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Apparatus for controlling a variable condition, comprising in combination, a normally balanced electrical bridge network, means responsive to a deviation of the condition from a selected value for unbalancing the network, condition controlling means responsive to the unbalance of the network for varying the condition and returning it toward its selected value, and means operative by said condition controlling means and at a rate proportional to the operation thereof for reducing the unbalance of the bridge independently of the control of the deviation of the condition over such unbalance.

2. Control apparatus for regulating the intake pressure of an engine by adjusting the compressing effect of a compressor supplying such pressure, comprising in combination, a normally balanced electrical network, means for unbalancing the network in response to a deviation of the intake pressure from a selected value, means responsive to such unbalance for adjusting the compressing effect of the compressor to overcome the said deviation of the pressure and for rebalancing said network, and means for preventing said previously named means from rebalancing the said network until the pressure returns exactly to its selected value.

3. Control apparatus for regulating the intake pressure of an engine by adjusting the compressing effect of a compressor supplying such pressure, comprising in combination, a normally balanced electrical network, means for unbalancing the network in response to a deviation of the intake pressure from a selected value, means responsive to such unbalance for adjusting the compressing effect of the compressor to overcome the said deviation of the intake pressure, means for rebalancing the said network, and separate means operative by said compressing effect adjusting means for counteracting the effect of said rebalancing means until the intake pressure returns exactly to its selected value.

4. Control apparatus for regulating the intake pressure of an engine by adjusting the compressing effect of a compressor supplying such pressure, comprising in combination, a normally balanced electrical network, means for unbalancing the network in response to a deviation of the pressure from a selected value, means responsive to such unbalance for adjusting the compressing effect of the compressor to overcome the said deviation of the pressure, and means operative by the said compressing effect adjusting means at a rate proportional to the rate of operation of the compressor for automatically reducing the effect of the said rebalancing means to thereby maintain the network in an unbalanced condition until the pressure has returned to its selected value.

5. In apparatus for regulating the intake pressure of an engine, a compressor, means for driving said compressor, speed control means for varying the operation of said driving means to vary in turn the compressing effect of said compressor, a pressure control device varied by means responsive to a pressure condition indicative of the need for operation of said compressor, means including said pressure control device for controlling said speed control means to vary the compressing effect of said compressor in accordance with variations in said pressure condition, and means tending to cause said pressure control device to be readjusted to a normal controlling position at a rate dependent upon the speed of said compressor whenever moved away from that position, said last named means comprising an element driven by said driving means at a rate having a definite relation to the speed at which the compressor is driven.

6. In apparatus for regulating the intake pressure of an engine, a compressor, means for driving said compressor, means for varying the operation of said driving means to vary in turn the compressing effect of said compressor, a motor for positioning said last named means, a control impedance means having a means for varying its impedance in accordance with a pressure condition indicative of the need for operation of said compressor, means including said control impedance means for controlling said motor to vary the compressing effect of said compressor in accordance with said pressure condition, and means tending to restore the impedance of said impedance means towards a normal value at a rate dependent upon the speed of said compressor whenever varied away from that value, said last named means comprising a cylinder driven by said driving means and an arm carrying a roller in rolling engagement with said cylinder, said arm being mounted for pivotal movement through a plane parallel to the axis of rotation of said cylinder and being associated with means for adjusting said impedance.

7. In apparatus for regulating the intake pressure of an engine, a compressor, means for driving said compressor, means for varying the operation of said driving means to vary in turn the compressing effect of said compressor, a motor for positioning said last named means, control resistance means including a relatively movable contact and resistor, said contact being positioned by means responsive to a pressure condition indicative of the need for operation of said compressor, electrical means including said resistance means for controlling said motor to vary the compressing effect of said compressor in accordance with said pressure condition, and means tending to cause said contact and resistor to return towards normal relative positions at a rate dependent upon the speed of said compressor whenever moved away from such positions, said last named means comprising a cylinder driven by said driving means and an arm carrying a roller in rolling engagement with said cylinder, said arm being mounted for pivotal movement through a plane parallel to the axis of rotation of said cylinder and being associated with said contact.

8. In apparatus for regulating the intake pressure of an engine, a compressor, means for driving said compressor, speed control means for varying the operation of said driving means to vary in turn the compressing effect of said compressor, a motor for positioning said last named means, a control impedance means, a follow up impedance means, each of said impedance means having a movable adjusting member to vary the impedance of the impedance means, the adjusting member of said control impedance means being positioned by pressure control means responsive to a pressure condition indicative of the need for operation of said compressor and the adjusting member of said follow up impedance means being positioned by said motor, electrical means including both of said impedance means for controlling said motor to vary the compressing effect of said compressor in accordance with said pressure condition, and means independent of said motor tending to cause one of said impedance means to return towards a normal impedance value at a rate dependent upon the speed of said compressor whenever said impedance means is adjusted away from that value, said last named means comprising an element driven by said driving means at a rate having a definite relation to the speed at which the compressor is driven.

9. In apparatus for regulating the intake pressure of an engine, a compressor, means for driving said compressor, means for varying the operation of said driving means to vary in turn the compressing effect of said compressor, a motor for positioning said last named means, a control impedance means, a follow up impedance means, each of said impedance means having a movable adjusting member to vary the impedance of the impedance means, the adjusting member of said control impedance means being positioned by means responsive to a pressure condition indicative of the need for operation of said compressor and the adjusting member of said follow up impedance means being positioned by said motor, electrical means including both of said impedance means for controlling said motor to vary the compressing effect of said compressor in accordance with said pressure condition, and means tending to cause one of said impedance means to return towards a normal impedance value at a rate dependent upon the speed of said compressor whenever said impedance means is adjusted away from that value, said last named means comprising a cylinder driven by said driving means and an arm carrying a roller in rolling engagement with said cylinder, said arm being mounted for pivotal movement through a plane parallel to the axis of rotation of said cylinder and being associated with means for adjusting said impedance means.

10. In apparatus for regulating the intake pressure of an engine, a compressor, means for driving said compressor, means for varying the operation of said driving means to vary in turn the compressing effect of said compressor, a control device comprising two elements relatively movable to vary the control effect of said device, means responsive to a pressure condition indicative of the need for operation of said compressor for varying the relative position of said elements, means including said control device for controlling said operation varying means to vary the compressing effect of said compressor in accordance with said pressure condition, and means effective whenever said pressure condition increases to cause said elements to move relatively in pressure decreasing direction by a relatively large amount regardless of the magnitude of the deviation and then to move back toward their original relative position.

11. In combination, a motor for positioning a control device for a variable speed driving means, said motor being adapted to be controlled by a control system of the follow-up type, a follow-up device adapted to be incorporated in said control system and having two elements relatively movable to vary the effect of said follow-up device, a driving connection between said motor and one of said elements to cause said motor to vary the relative positions of said elements, and means tending to restore said elements to predetermined relative positions whenever changed by said motor, said means comprising a cylinder adapted to be connected to said driving means and an arm carrying a member in frictional engagement with said cylinder, said arm being pivoted for movement in a plane parallel to the axis of rotation of said cylinder and being operatively connected to one of said elements.

12. In combination, a motor for positioning a control device for a variable speed driving means, said motor being adapted to be controlled by a control system of the follow-up type, a follow-up resistance device adapted to be incorporated in said control system and having a resistance element and a contact element relatively movable to vary the effect of said resistance device, a driving connection between said motor and one of said elements to cause said motor to vary the relative positions of said resistance and contact elements, and means tending to restore said elements to predetermined relative positions whenever changed by said motor, said means comprising a cylinder adapted to be connected to said driving means and an arm carrying a member in frictional engagement with said cylinder, said arm being pivoted for movement in a plane parallel to the axis of rotation of said cylinder and being operatively connected to the other of said elements.

13. In combination, a condition changing means, regulating means for said condition changing means for varying the condition changing effect of said condition changing means, motor means for positioning said regulating means, a controlling device, a follow-up device, said devices each having a movable adjusting member to vary its controlling effect, the adjusting member of said controlling device being positioned by means responsive to a condition indicative of the need for operation of said condition changing means and the adjusting member of said follow-up device being positioned by said motor means, a follow-up system including said controlling and follow-up devices for controlling said motor means to vary the condition changing effect of said condition changing means in accordance with the value of said condition, and means tending to cause one of said devices to return towards a normal controlling effect at a rate dependent upon the condition changing effect of said condition changing means whenever the controlling effect of said device is adjusted from normal.

14. In combination, a condition changing means, regulating means for said condition changing means for varying the condition changing effect of said condition changing means, motor means for positioning said regulating means, a controlling device, a follow-up device, said devices each having a movable adjusting member to vary its controlling effect, the adjusting member of said controlling device being positioned by means responsive to a condition indicative of the need for operation of said condition changing means and the adjusting member of said follow-up device being positioned by said motor means, a follow-up system including said controlling and follow-up devices for controlling said motor means to vary the condition changing effect of said condition changing means in accordance with the value of said condition, and means tending to cause one of said devices to return towards a normal controlling effect at a rate dependent upon the condition changing effect of said condition changing means whenever the controlling effect of said device is adjusted from normal, said last named means comprising an element continuously driven at a rate dependent upon the condition changing effect of said condition changing means.

15. In combination, a condition changing means, regulating means for said condition changing means for varying the condition changing effect of said condition changing means, motor means for positioning said regulating means, a controlling device, a follow-up device, said devices each having a movable adjusting member to vary its controlling effect, the adjusting member of said controlling device being positioned by means responsive to a condition indicative of the need for operation of said condition changing means and the adjusting member of said follow-up device being positioned by said motor means, a follow-up system including said controlling and follow-up devices for controlling said motor means to vary the condition changing effect of said condition changing means in accordance with the value of said condition, and means tending to cause said controlling device to return towards a normal controlling effect at a rate dependent upon the condition changing effect of said condition changing means whenever the controlling effect of said device is adjusted from normal.

16. In combination, a condition changing means, regulating means for said condition changing means for varying the condition changing effect of said condition changing means, motor means for positioning said regulating means, a controlling device, a follow-up device, said devices each having a movable adjusting member to vary its controlling effect, the adjusting member of said controlling device being positioned by means responsive to a condition indicative of the need for operation of said condition changing means and the adjusting member of said follow-up device being positioned by said motor means, a follow-up system including said controlling and follow-up devices for controlling said motor means to vary the condition changing effect of said condition changing means in accordance with the value of said condition, and means effective to modify the action of said motor means in positioning the adjusting member of said follow-up device so as to tend to cause said follow-up device to return towards a normal controlling effect despite said motor means at a rate dependent upon the condition changing effect of said condition changing means whenever the controlling effect of said device is adjusted from normal.

17. Apparatus for controlling the intake pressure of an aircraft engine having air supercharger means, comprising in combination, supercharger control means, means including pressure responsive means for effecting adjustment of said control means when the pressure deviates from a predetermined control point, said last named means when operating on said control means effecting a change in the control point with changes in demand for supercharger operation, and load compensating means connected to and operating on said last named means for maintaining the intake pressure at a constant value.

18. Control apparatus for regulating the intake pressure of an aircraft engine by adjusting the compression ratio adjusting means of a compressor supplying such pressure, comprising in combination, control means including a device adapted to respond to said intake pressure for producing a control effect dependent upon the value of said intake pressure, positioning means adapted to position such a ratio adjusting means, follow-up means operated by said positioning means for producing a follow-up effect, balanceable means including said control and follow-up means for causing the operation of said positioning means so as to tend to maintain a predetermined relationship between the magnitude of said control effect and the position of said positioning means, and means operative upon said intake pressure continuing to maintain a value other than the selected value to slowly affect said balanceable means to alter said predetermined relationship in a direction such as to tend to cause said condition to be restored to said selected value.

19. Control apparatus for regulating the intake pressure of an aircraft engine by adjusting the compression ratio adjusting means of a compressor supplying such pressure, compressing in combination, control means including a device adapted to respond to the intake pressure for producing an electrical control effect dependent upon the value of said intake pressure, positioning means adapted to position such ratio adjusting means, follow-up means operated by said positioning means for producing an electrical follow-up effect, a balanceable electrical network including said control and follow-up means for causing operation of said positioning means so as to tend to maintain a predetermined relationship between the magnitude of said control effect and the position of said positioning means, and adjusting means operative when said intake pressure continues to maintain a value other than a selected value to slowly affect said network to alter the balance thereof in a direction tending to cause said condition to be restored to said selected value.

20. Control apparatus for regulating the intake pressure of an aircraft engine having a compressor whose compressing effect is adjusted by said apparatus, comprising in combination, control means including a device adapted to respond the intake pressure for adjusting a variable impedance device an amount dependent on the value of the intake pressure, positioning means adapted to position compressing effect adjusting means; follow-up means operated by said positioning means for producing an adjustment of a follow-up impedance, an electrical impedance network including said variable and follow-up impedances, means including said control means and said follow-up means when adjusting their respective impedances and causing operation of said positioning means so as to tend to maintain a predetermined relationship between the magnitude of intake pressure and the position of said positioning means, and adjusting means operative upon the intake pressure continuing to maintain a value other than a selected value to slowly affect an impedance of said network to alter said predetermined relationship in a direction tending to cause the intake pressure to be restored to said selected value.

ALBERT E. BAAK.

REFERENCES CITED

The following references are of record in the file of this patent:

UNITED STATES PATENTS

| Number | Name | Date |
| --- | --- | --- |
| 1,240,531 | Banner | Sept. 18, 1917 |
| 2,007,777 | Standerwick | July 9, 1935 |
| 2,127,589 | Erban | Aug. 23, 1938 |
| 2,187,737 | Gregory | Jan. 23, 1940 |
| 2,220,951 | Borden | Nov. 12, 1940 |
| 2,228,239 | Amman | Jan. 14, 1941 |
| 2,278,391 | Saur | Mar. 31, 1942 |
| 2,297,495 | Pfau | Sept. 29, 1942 |
| 2,320,837 | Turner et al. | June 1, 1943 |
| 2,339,150 | Codrington | Jan. 11, 1944 |
| 2,353,201 | Talbot | July 11, 1944 |
| 2,376,142 | Hoffman et al. | May 15, 1945 |
| 2,376,199 | Shoults | May 15, 1945 |
| 2,377,199 | Adams et al. | May 29, 1945 |